May 14, 1935.  O. B. MUELLER ET AL  2,001,538
HEATING TOOL
Filed June 2, 1933  3 Sheets-Sheet 1
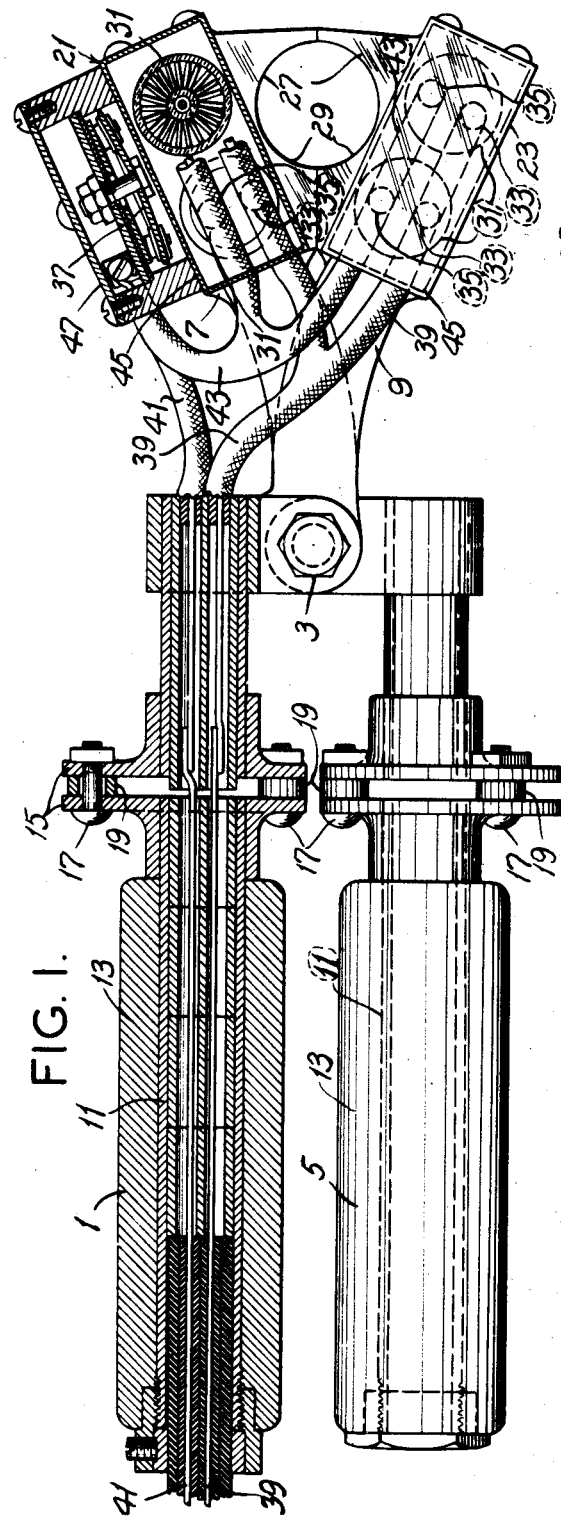
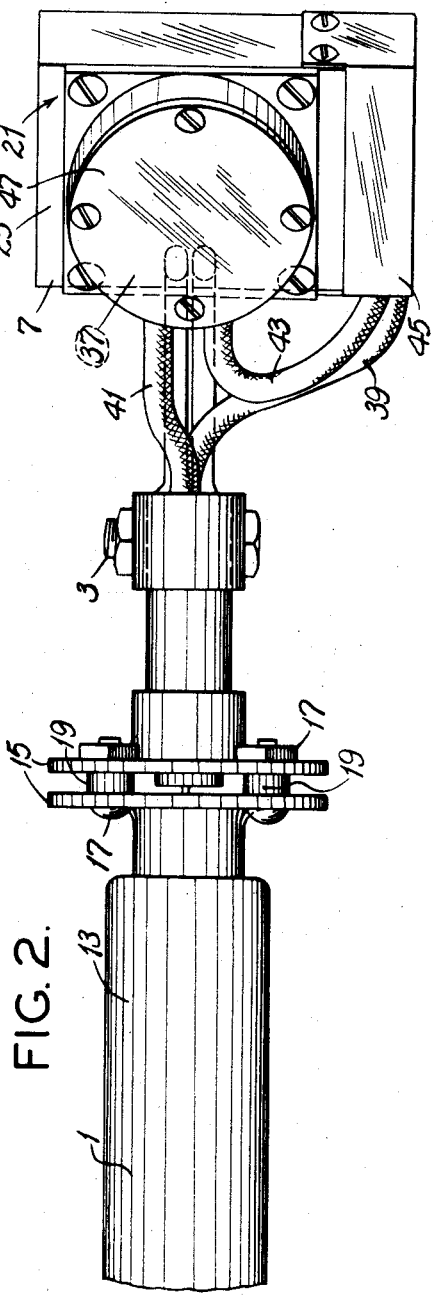
Oscar B. Mueller,
Charles A. Hill,
John W. Tielking,
Gordon R. Jones,
Inventors,
Delos G. Haynes,
Attorney.

May 14, 1935.　　O. B. MUELLER ET AL　　2,001,538
HEATING TOOL
Filed June 2, 1933　　3 Sheets-Sheet 2
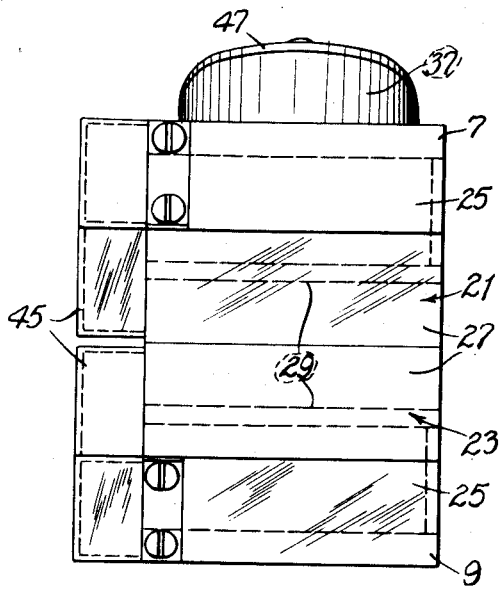
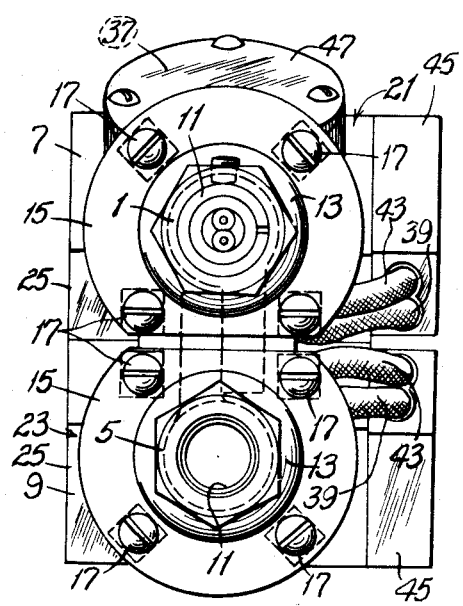
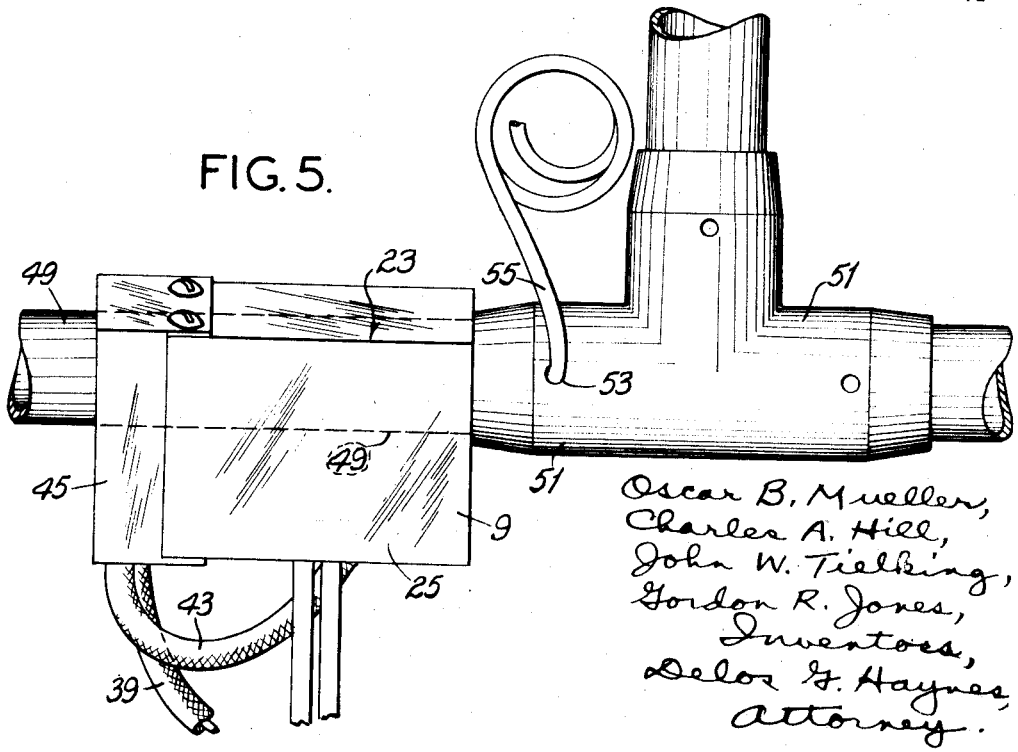

May 14, 1935.  O. B. MUELLER ET AL  2,001,538
HEATING TOOL
Filed June 2, 1933   3 Sheets-Sheet 3
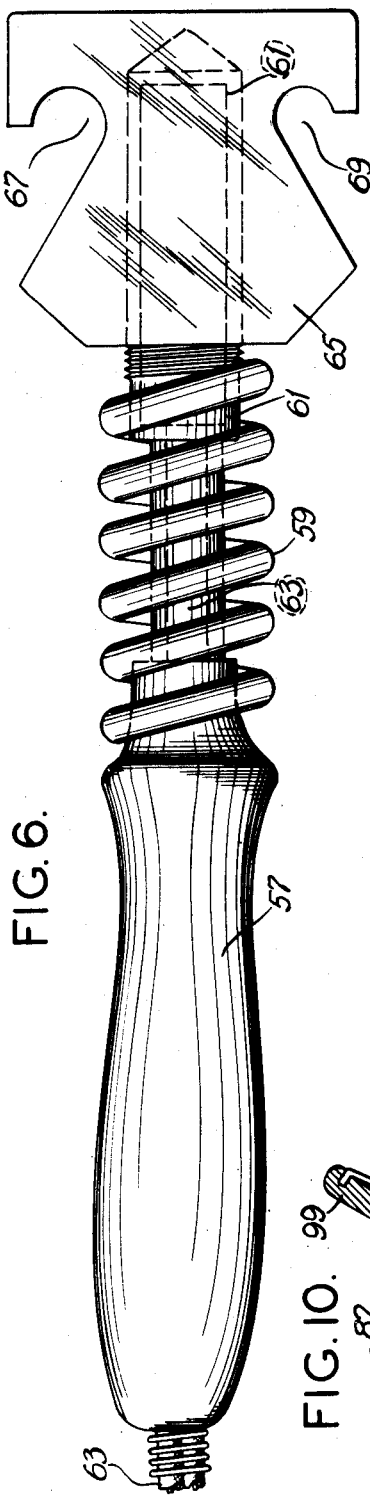
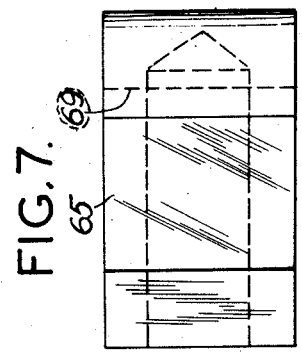
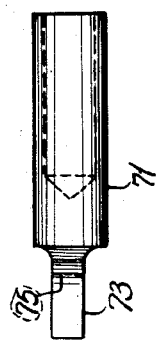
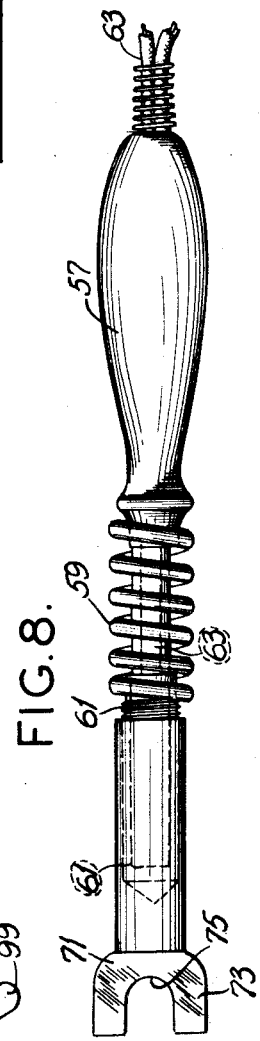
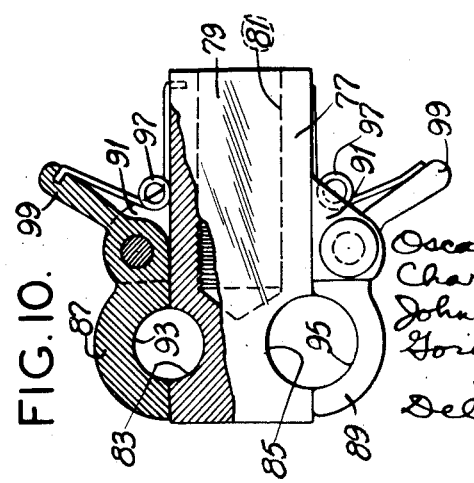
Oscar B. Mueller,
Charles A. Hill,
John W. Tielking,
Gordon R. Jones,
Inventors,
Delos G. Haynes,
Attorney Patented May 14, 1935

2,001,538

UNITED STATES PATENT OFFICE 2,001,538

HEATING TOOL

Oscar B. Mueller, Charles A. Hill, and John W. Tielking, Port Huron, Mich., and Gordon R. Jones, Rochester, N. Y., assignors to Mueller Brass Co., Port Huron, Mich., a corporation of Michigan Application June 2, 1933, Serial No. 674,010

3 Claims. (Cl. 219—26)

This invention relates to heating tools, and with regard to certain more specific features, to electric heating tools particularly adapted to heat the elements to be associated into a soldered pipe or like joint.

Among the several objects of the invention may be noted the provision of an electric heating tool of the class described which is so shaped as to present maximum heat conductance surfaces between itself and the pipe, or fitting, to be heated; a tool which is adapted to deliver or distribute the heat necessary to make the desired joint at such regions as are capable of making optimum use of such heat; a tool of the class described which includes means for concentrating the heat produced in a well-defined area of the tool, whereby excessively hot handles, and the like, are avoided; a tool of the class described which includes thermostatic means for regulating the temperature of the tool at all times; and a tool of the class described which is relatively light in weight and portable, whereby it may readily be carried from joint to joint in an installation system, and otherwise used with facility. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a front elevation, partly in section, of a preferred form of the invention;

Fig. 2 is a side elevation of the tool of Fig. 1;

Fig. 3 is a top plan view of the tool of Fig. 1;

Fig. 4 is a bottom plan view of the tool of Fig. 1;

Fig. 5 is a view illustrating the use of the tool of Fig. 1;

Fig. 6 is a front elevation of another embodiment of the invention;

Fig. 7 is a side elevation of the head of the tool of Fig. 6;

Fig. 8 is a front elevation of still a further embodiment of the invention;

Fig. 9 is a side elevation of the head of the tool of Fig. 8; and,

Fig. 10 is a front elevation, partly in section, of an alternative form of tool head.

Similar reference characters indicate corresponding parts throughout the several views of the drawings.

Heretofore it has been the custom, when making a pipe joint for example of the type of Hill Patent 1,770,852, to assemble the pipe and fitting, and then to play a blow torch about the joint until its temperature was properly elevated, and finally to run solder into the joint, the solder being melted by the heat left in the joint by the blow torch. In numerous instances the use of a blow torch as an incident to the making of a joint has been considered objectionable; it is noisy and sooty, and creates a real fire hazard.

The present invention presents an electrical heating tool which is designed to replace the blow torch in the making of such pipe joints, thereby entirely eliminating the noise, soot, and fire hazard objections.

A principal feature to be realized in the construction of an electrical heating tool for such purposes is that the heat must be applied over a limited area in a concentrated manner, and must be applied uniformly throughout said area at all times, for, in distinction to the blow torch method of heating, the electrical method is essentially a sedentary one, not permitting of the "playing" of the flame from one side to another to ensure uniform heating. For this reason, substantially all existing forms of electrical heaters (such as hot plates, spot heaters, soldering irons, and the like) are unsuitable for the almost universally cylindrical pipe and pipe fittings.

In some respects, the present invention might be termed a soldering iron, but it differs from such instruments in that a soldering iron carries the molten solder in addition to heating the objects to be soldered, while the present invention functions only (that is, primarily) as a heating means, and does not, intentionally perform any solder-carrying function.

The uniform, intense heating of the present invention is accomplished primarily by the design of the element which conducts the heat to the pipe or fitting. This may be generally described as an element which embraces at least half (and preferably more) of the circumference of the cylindrical pipe or fitting, touching said pipe or fitting uniformly throughout that region of the circumference contacted. Of course, the greater the proportion of the circumference of the pipe or fitting contacted, the quicker the heating of the joint will take place; but it has been proved that a uniform heating is obtained when the heating tool contacts only one-half of the circumference of the pipe or fitting, the other, uncontacted half being heated by conduction from the contacted half.

The preferred embodiment of the invention, as shown in Figs. 1 through 5, is arranged to contact the entire circumference of the pipe or fitting, and thus the heating efficiency is enhanced to a high degree. Referring now more particularly to these figures, numeral 1 indicates a handle, which is pivoted as at 3 to a similar handle 5. Extending above the pivot 3 from the hande 1 is an extension 7, and a similar extension 9 is provided for the handle 5. The handles 1, 5 and extensions 7, 9 are together arranged in the manner of a pair of pliers; that is, when the handles 1 and 5 are separated, the extensions 1 and 7 likewise separate.

The handles 1 and 5 each comprise metal tubes 11 of some strength, which tubes are surmounted by hand-pieces 13 formed preferably of molded asbestos or like material non-conductive to heat (for the purpose of preventing burning of the hands of the user.) The tubes 11 are cut near their upper ends, and each side of the cut is provided with a flange 15, the two flanges 15 for each handle facing each other. Bolts 17 (four of them, for example, for each handle) join the two flanges 15 associated with each handle, and spacing washers 19 on each bolt 17 hold the flanges spaced apart. The washers 19 are preferably formed of a thermally non-conductive material. The purpose of this arrangement of flanges, bolts, and washers is to cut down the heat conductance from the heating elements to the handles proper.

Mounted on the ends of the extensions 7 and 9 are the heating elements 21 and 23, respectively, of the present invention. Each heating element comprises a block of metal of high heat conductivity, such as copper, which is provided with a rectangular block portion 25 and a wedge-shaped portion 27, which are integral. The element 23 is, however, a reverse duplicate or "mirror image" of the element 21. In closed position, as illustrated in Fig. 1, the wedge portions 27 fit together as the jaws of a pair of pliers. In each wedge portion 27, on the engaging face thereof, is provided a semi-cylindrical notch 29, the notches 29 fitting together to form a cylindrical passage through the device. The diameter of this passage is made equal to the diameter of the pipe it is desired to operate upon with the tool in question.

In the rectangular block portions 25 of the elements 21 and 23 are provided cylindrical recesses (two to each block) extending into the blocks from one end thereof in a parallel relationship to the notches 29. In each of the four recesses thus provided is inserted a cartridge heating element 31. The cartridges 31 are of customary construction, and comprise resistances wound in such manner as to deliver a high degree of heat on the outer surfaces thereof. Each cartridge 31 is provided with a pair of terminals 33 and 35, respectively.

The arrangement of the cartridges 31 with respect to the notches 29 is such that the distance from any point on the surfaces of notches 29 to the nearest cartridge is, generally speaking, substantially equal to the distance from any other point to its nearest cartridge. This arrangement is obviously not accurate, but is achieved to the maximum extent permissible from the shapes of the elements. The purpose is to provide, so far as possible, a continuous surface of uniform temperature for the interior of the pipe-receiving notches 29. Such variations in distances as occur practically are compensated for, to a large measure, by the high heat conductivity of the metal of which the heating elements are formed.

Mounted on the element 21 is a thermostatic device, which, in the device as illustrated, comprises a bimetallic snap-acting disc 37 provided with suitable contacts and terminals to make and break an electrical circuit. The disc 37 is in heat conductive relationship to the heating element 21, and controls the flow of electrical current in accordance with the temperature of the said element 21. The element 23 may be presumed to be at the same temperature. It is to be understood that other suitable types of thermostatic controls may be substituted for the disc 37.

The electrical connections of the device are as follows: Passing in through the handle 1 are a pair of high amperage insulated conductors 39 and 41, which are connected to the source of electrical current. One conductor 39 connects to all of the terminals 33 of the cartridges 31. The other conductor 41 connects to the thermostatic control 37. From the other side of the thermostatic control 37 a conductor 43 connects to all of the terminals 35 of the cartridges 31. Thus, all cartridges are connected in parallel, and the bank of cartridges is connected in series with the thermostatic control.

Cover plates 45 are provided for the ends of the block portions 25, to conceal the connections to the cartridges. A cover plate 47 is likewise provided for the thermostatic control 37.

While the device as illustrated shows two heating cartridges for each jaw, it will be apparent that more or less cartridges could be used within the limits of the invention.

The application of the tool as thus described to a pipe joint to be made is shown in Fig. 5. Numeral 49 indicates a pipe, numeral 51, a fitting telescopingly receiving the pipe (and of the type shown in Hill Patent 1,770,852), and numeral 53 a sprue in the fitting 51 through which solder eventually will be fed. The tool is opened and clamped upon the pipe 49, the edges of the tool abutting the end of the fitting 51. If the tool is hot, the pipe will immediately commence to heat, and the fitting will also be heated by conductance from the pipe. It is assumed that the pipe and fitting have been properly cleaned and fluxed prior to the heating operation. When the proper temperature has been achieved, wire solder 55 is fed through the sprue 53, the heat of the fitting and the pipe serving to melt the solder in place, and the molten solder spreads throughout the interfaces of the pipe and fitting by capillary attraction. The spreading of the solder is aided at this time if the pipe is rotated in the fitting, using the handle of the heater as a lever. Finally the heater is removed and the joint allowed to cool.

While the preferred form of the invention is that illustrated in Figs. 1 through 5, that is by no means the only successful embodiment. Its cost might be prohibitive under certain circumstances. For such circumstances, the invention may well take one of the forms illustrated in Figs. 6 through 10.

In Figs. 6 and 7 is shown an embodiment of the invention in which no jaw effect is provided, the heater rather comprising a simple handle 57, to which is attached, by means of a heat-dissipating supporting coil 59, a single pointed "soldering iron" cartridge heating element 61, of customary construction. Inside the coil 59 are the electrical supply lines 63 for the cartridge 61. Instead of the usual pointed soldering iron head, the present device is provided with a block-shaped head 65, made of highly conducting metal such as copper, and provided on either side 67 and 69, the inner ends of which are slightly more than semi-cylindrical. The angle of the notches 67 and 69 to the handle 57 is such that, when the device is hung upon a pipe, the notch assumes a nearly horizontal position and embraces and contacts a maximum area of the circumference of the pipe. The notches 67 and 69 are shaped to embrace, thusly, at least one half of the circumference of the pipe. The notches 67 and 69 are desirably of different size, in order to adapt the one heater to two separate pipe sizes.

The use of this embodiment of the invention is made in the manner indicated, namely, by hanging the heater on the pipe to be joined, and thus heating the pipe by conduction. Preferably, the heater is swung from side to side to increase the directly-contacted area of the pipe and thus to facilitate quick and uniform heating.

The embodiment shown in Figs. 8 and 9 has the advantage of being the cheapest of the several embodiments of the invention, and by reason of its cheapness, it can forego some of the advantages of other embodiments. So far as the handle, coil, and cartridge are concerned, it is identical to the Fig. 6 embodiment, and the same index characters are thus used in Fig. 6 and Fig. 8 for these elements. A head 71 formed of copper or the like is provided which is generally cylindrical to receive the cartridge 61, but which has an end rectangular extension 73. In the extension 73 is a notch 75, the bottom of which is semi-cylindrical. Thus, when this embodiment of the invention is applied to a pipe, it contacts half of the circumference of the pipe, and in heating, it is again desirable to rotate the heater on the pipe so as to contact, during the heating period, substantially the entire circumference of the pipe uniformly.

In Fig. 10 is shown a head 77 which may be substituted for the heads in the embodiments of either Fig. 6 or Fig. 8. It comprises a rectangular block portion 79, which is bored as at 81 to receive the heating cartridge, and which, on either side of its upper end, is provided with semi-cylindrical notches 83 and 85, differing in diameter. Below the notches 83 and 85 are pivotally mounted clamping pieces 87 and 89, respectively, on ears 91 extending from the block 79. The faces of the clamping pieces 87 and 89 are provided with notches 93 and 95, which correspond in diameter to their respective notches 83 and 85. Springs 97 urge the clamping pieces always to closed position, but extending handles 99 permit the pieces to be opened manually at any time to allow the insertion of a pipe. The resulting pipe-receiving holes are of different diameters, and thus the head is adapted to heat two different sizes of pipes. In heating, the entire circumference of the pipe is heated at once, for the clamping pieces receive their heat by conduction from the main block portion 79, and distribute it to the pipe. In operating this embodiment of the device, asbestos gloves or the like should be worn by the operator to prevent his fingers from being burned by touching the handles 97.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A soldering tool comprising an electrical resistance heating unit, and a head fitted to said unit and enclosing the same, said head comprising a block of metal of good heat conductivity, and at least one notch in said head, said notch being bottomed by a semi-cylindrical portion having a circular surface in excess of 180° of arc, whereby said notch is adapted to receive a pipe and closely surround the same over more than half of the circumference thereof.

2. A soldering tool comprising a handle, an electrical resistance heating unit, and a head fitted to said unit and enclosing the same, said head comprising a block of metal of good heat conductivity having at least one notch therein, said notch being at an angle to the axis of the handle of said tool such that when said tool is hung upon a pipe, said notch is substantially horizontal, said notch being bottomed by a semi-cylindrical portion adapted to closely surround the pipe upon which the tool is hung over at least half of the circumference thereof.

3. A soldering tool comprising a handle, an electrical resistance heating unit, and a head fitted to said unit and enclosing the same, said head comprising a block of metal of good heat conductivity having a notch therein, said notch being so positioned with respect to the center of gravity of said tool that when said tool is freely hung upon a pipe, said handle is at an angle to the vertical, and said notch being bottomed by a semi-cylindrical portion adapted to closely surround the pipe upon which the tool is hung over at least half of the circumference thereof.

OSCAR B. MUELLER.
CHARLES A. HILL.
JOHN W. TIELKING.
GORDON R. JONES.